United States Patent Office 2,789,119
Patented Apr. 16, 1957

2,789,119
PRODUCTION OF FATTY ACID MONOGLYCERIDES

Bernard Thomas Dudley Sully, Ewell, England, assignor to A. Boake Roberts and Company Limited, London, England, a British company No Drawing. Application February 4, 1955,
Serial No. 486,269

Claims priority, application Great Britain
February 9, 1954

14 Claims. (Cl. 260—410.7)

This invention relates to an improved process for the preparation of monoglycerides from naturally occurring fatty oils, fats, or artificially prepared esters of higher fatty acids, by which is meant those fatty acids which are substantially insoluble in water.

The usual procedure for the preparation of the so-called monoglycerides of commerce—as, for example, glyceryl monostearate—is to heat to a high temperature—as, for example, 200° C.—a mixture of the fatty acid and glycerol with or without a catalyst, or alternatively to heat a stearic acid glyceride—as, for example, hydrogenated neutral fat—together with glycerol and a catalyst. The value of the product in use is proportional to the amount of monoglyceride that it contains. The product of either procedure, however, contains less than 50% and often as low as 25% of true glyceryl monostearate, the balance being glyceryl di-stearate and a smaller proportion of tri-stearate. One method by which the monoglyceride proportion is increased is to subject the product to molecular distillation whereby the monoglyceride is obtained in a relatively pure state and the di-glyceride is recovered as a residue which can be returned to a re-esterification process.

Chemical methods of increasing the proportion of monoglyceride have also been proposed and depend for their success on the use of a solvent to increase the solubility of the glycerol in the fatty oil so that the effective proportion of glycerol is increased. Thus, T. P. Hilditch and J. G. Rigg, J. C. S. 1935, 1774, have proposed the use of phenol for this purpose. The process operates at a high temperature and requires the use of an acid catalyst. Unfortunately, however, it has been found that the phenol undergoes some condensation with the stearic acid and glycerol and introduces impurities which are not readily separated. It has also been proposed to use dioxane, but the reaction tends to be erratic and the material is toxic. The most recent proposal by K. F. Mattil and R. J. Sims, J. Amer. Oil C. S., 1952, 29, 59, is to use a tertiary aromatic amine such as pyridine, the picolines or isoquinoline as solvents for the reaction. Again there are difficulties caused by odour and toxicity.

It has now been found that tertiary butyl alcohol is an excellent reaction medium and that it is not esterified by the fatty acid under the conditions of the reaction. It is non-toxic, relatively odourless, and has a low boiling point so that it can be removed easily at the completion of the reaction. It is dehydrated under acid conditions and is therefore used in an inter-esterification process between neutral fatty glycerides and glycerol with an alkaline catalyst. If water is absent from the reaction then the inter-esterification reaction in tertiary butyl alcohol proceeds readily at room temperature and equilibrium is reached in less than about 24 hours.

According to the present invention, therefore, a process for the production of monoglycerides of fatty acids comprises reacting with glycerol in the presence of tertiary butyl alcohol and an alkaline catalyst a di- or tri- glyceride of a fatty acid which is insoluble in water or a mixture of glycerides of said fatty acids, and separating the monoglyceride from the reaction products; any water present in the reaction ingredients being removed before commencing the reaction.

The catalyst may be sodium methoxide prepared by the action of metallic sodium on methyl alcohol, or sodium tertiary butoxide, prepared by the action of sodium on tertiary butyl alcohol. Magnesium alkoxides can also be used. Experiment has shown, however, that the most convenient catalyst is sodium or potassium glyceroxide prepared by dissolving the appropriate catalytic proportion of alkali metal hydroxide in the whole of the glycerol and removing the water of reaction by distillation under vacuum. This method is particularly convenient because it is necessary in any case to distil part of the glycerol to remove every trace of water before it can be used in the process. The tertiary butyl alcohol must also be dry and this is conveniently achieved by distillation under fractionating conditions, either alone or preferably in the presence of a small proportion of hexane which makes it possible to remove the water as a separate layer and has the further advantage that it prevents the alcohol from freezing. Tertiary butyl alcohol when pure melts at 25° C.

The invention may conveniently be carried out by using neutral animal or vegetable oils as starting materials. Thus, tallow or hydrogenated tallow, olive oil, linseed oil, soya bean oil, castor oil, and a mixed blend of oils as used in the manufacture of margarine, have been successfully employed for preparing monoglyceride products using 50–60 parts by weight of glycerol for every 100 parts by weight of oil, and in each case yields of 70–75% of monoglycerides have been obtained. The invention, however, may be equally well carried out with any neutral liquid or solid glyceride, such as fish oils, Chinese tung oil, cotton seed oil, hemp seed oil, poppy seed oil, rape oil, sunflower oil, and the like. When utilising the neutral oil as starting material, it is convenient to dissolve the oil in tertiary butyl alcohol containing hexane and to distil the mixture until all water has been removed. The appropriate quantity of sodium or potassium hydroxide is then added to the glycerol contained in a second vessel, and the mixture is distilled under vacuum to remove both the water of reaction and the water originally present in the glycerol. The glycerol solution of catalyst is then added to the dry oil solution and the mixture is allowed to stand for 24 hours. At the end of this period the catalyst is neutralised with any acid which will not have a deleterious action on the reaction products, e. g. by the addition of citric acid and the tertiary butyl alcohol is recovered by distillation. When the temperature begins to rise, water is added and the distillation is continued under vacuum to remove every trace of tertiary butyl alcohol. The residue from the distillation is allowed to separate into two layers, an upper layer of monoglycerides and a lower layer of glycerol and water.

In those cases where crystallisation of the monoglyceride from the reaction products is possible, as is usually the case where the monoglycerides obtained are solid, the crystals may be separated by filtration without neutralisation and the mother liquor containing the catalyst together with di- and tri-glycerides, and possibly some glycerol, may be used for the production of further monoglyceride if it is prevented from taking up moisture or freed from any moisture which may be taken up.

The process according to the invention may also be operated by starting with the free fatty acid and first heating the acid with glycerol in known manner, for example, to a temperature of 200° C., and then dissolving the reaction products, consisting mainly of the mono, di, and tri-glycerides, in tertiary butyl alcohol and dehydrating the mixture by distillation. This solution can then be reacted with the glycerol containing the catalyst.

The following examples illustrate the above mentioned ways of carrying out the invention:

EXAMPLE 1

The preparation of monoglycerides of olive oil

A mixture containing olive oil (100 g.), tertiary butyl alcohol (200 g.), hexane (40 grams.) was distilled with a fractionating column to remove every trace of water. To another flask was added glycerol (60 g.) containing sodium hydroxide (0.7 g.). The latter mixture was also distilled to remove every trace of water and to convert the sodium hydroxide to sodium glyceroxide. The glycerol containing the catalyst was then added to the olive oil solution and allowed to remain at 40° C. overnight. The following morning citric acid (2.5 g.) was added in order to neutralise the catalyst, and the tertiary butyl alcohol was removed by warming on a water bath under a partial vacuum. Water (40 g.) was added and the distillation was continued in order to remove every trace of tertiary butyl alcohol. The residual mixture of glyceryl mono-oleate and aqueous glycerol was allowed to separate. The glyceryl mono-oleate layer was solid at room temperature and contained 70% of the mono-ester.

EXAMPLE 2

The preparation of glyceryl monostearate

Glyceryl stearate (100 g.) as prepared in known manner by heating glycerol with stearic acid and containing 35% of the mono-ester, along with the di- and tri-esters, was dissolved in a mixture of tertiary butyl alcohol (200 g.) and hexane (40 g.). To this solution, after drying by distillation, was added potassium hydroxide (1.0 g.) in glycerol (60 g.) from which the free water and the water of reaction has been removed by distillation under vacuum. The weight of dry potassium glyceroxide solution added was 47.6 g. The mixed solution was slowly stirred at room temperature for three days during which the initially formed amorphous precipitate gradually crystallised to pure mono-ester. The increased proportion of glycerol caused by the precipitation and crystallisation results in a redistribution of esters in the mother liquor and it will also be apparent that the concentration of mono-ester in the mother liquid will tend to increase in such a way that the production of pure crystals is favoured. The slurry of crystals produced in this way was separated by filtration and after drying contained 91% of mono-ester (70 g.).

EXAMPLE 3

The preparation of glyceryl monostearate

This example illustrates the operation as described in Example 2 without separation of the product by filtration. The product is naturally less pure but is as effective as the highly purified product in most of its applications.

Into a flask fitted with a column of approximately five equivalent plates add:

| | Gms. |
|---|---|
| Tertiary butyl alcohol | 220 |
| Hexane | 40 |
| Glyceryl stearate prepared by heating glycerol with stearic acid and containing 35% of the mono-ester | 100 |

Distil at atmospheric pressure until dry.

Into another flask add glycerol (75 gms.) and sodium hydroxide (0.7 gm.). Distil away about 15 gms. of the glycerol in order to remove the water of reaction and convert the sodium hydroxide into sodium glyceroxide. Add the residue to the solution of glyceryl stearate at a temperature of about 30° C. and allow the mixture to cool to about 10° C. with very gentle stirring that is continued for about one to three days. During this period the glyceryl monostearate crystallises from the solution and the conversion of the glyceryl stearate to the mono-ester reaches a maximum of about 84–86% as determined by the periodate method of analysis. The catalyst is neutralised by the addition of the calculated quantity of finely ground citric acid to give a pH of 4.0 when water is added, and in this way the catalyst is neutralised without causing hydrolysis of the ester. Distilled water is added next in an amount equal to half the volume of the reaction mixture and the pH of the aqueous layer is adjusted if necessary to 4.0. The aqueous glycerol solution separates readily, but if any difficulty is experienced the mixture is warmed to about 40° C. so that the separated glyceryl monostearate dissolves. The washing procedure is repeated twice more to remove all the free glycerol. The tertiary butyl alcohol and hexane are removed by cautious distillation using a water bath for heating. The last traces are removed by steam distillation under high vacuum at a temperature just above the melting point of the fat. The residual monoglyceride is poured into a mould and allowed to set. It contains 84–86% of glyceryl monostearate.

I claim:

1. A process for the production of mono-glycerides of fatty acids, which comprises reacting with glycerol in the presence of tertiary butyl alcohol and an alkaline catalyst a glyceride selected from the group consisting of di- and tri-glycerides of those fatty acids which are substantially insoluble in water, and mixtures of glycerides of the said fatty acids, and separating the mono-glycerides from the reaction products; any water present in the reaction ingredients being removed before contacting the said ingredients.

2. A process for the production of mono-glycerides of fatty acids, which comprises reacting with glycerol in the presence of tertiary butyl alcohol and an alkali glyceroxide a glyceride selected from the group consisting of di- and tri-glyceride of those fatty acids which are substantially insoluble in water, and mixtures of glycerides of the said fatty acids, and separating the mono-glycerides from the reaction products; any water present in the reaction ingredients being removed before contacting the said ingredients.

3. A process for the production of monoglycerides of fatty acids, which comprises reacting with glycerol in the presence of tertiary butyl alcohol and an alkaline catalyst a glyceride selected from the group consisting of di- and tri-glycerides of those fatty acids which are substantially insoluble in water, and mixtures of glycerides of the said fatty acids, and separating the mono-glycerides from the reaction products; any water present in the reaction ingredients being removed by distillation under fractionating conditions before contacting the said ingredients.

4. A process for the production of mono-glycerides of fatty acids, which comprises reacting with glycerol in the presence of tertiary butyl alcohol containing a minor proportion of hexane and an alkali glyceroxide, a glyceride selected from the group consisting of di- and tri-glycerides of those fatty acids which are substantially insoluble in water, and mixtures of glycerides of the said fatty acids, and separating the mono-glycerides from the reaction products; any water present in the reaction ingredients being removed by distillation under fractionating conditions before contacting the said ingredients.

5. A process for the production of mono-glycerides of fatty acids, which comprises reacting with glycerol in the presence of tertiary butyl alcohol and an alkaline catalyst a glyceride selected from the group consisting of animal or vegetable oils and partial glycerides derived from the said oils, and separating the mono-glycerides from the reaction products; any water present in the reaction ingredients being removed before contacting the said ingredients.

6. A process for the production of mono-glycerides of fatty acids, which comprises reacting with glycerol in the presence of tertiary butyl alcohol containing a minor proportion of hexane and an alkali glyceroxide, a glyceride selected from the group consisting of animal or vegetable oils and partial glycerides derived from the said oils, and separating the monoglyceride from the reaction products; any water present in the reaction ingredients being removed by distillation under fractionating conditions before contacting said ingredients.

7. A process for the production of mono-glycerides of fatty acids, which comprises dissolving in tertiary butyl alcohol containing a minor proportion of hexane a glyceride selected from the group consisting of animal or vegetable oils and partial glycerides derived from the said oils, and mixing the solution thus obtained with glycerol containing an alkaline catalyst, each solution being freed of any mixture present by distillation prior to mixing, allowing to stand until equilibrium is obtained, and separating the monoglyceride from the reaction products.

8. A process for the production of mono-glycerides of fatty acids, which comprises dissolving in tertiary butyl alcohol containing a minor proportion of hexane a glyceride selected from the group consisting of animal or vegetable oils and partial glycerides derived from the said oils, and mixing the solution thus obtained with glycerol containing an alkali glyceroxide, each solution being freed of any mixture present by distillation prior to mixing, allowing to stand until equilibrium is obtained, and separating the monoglyceride from the reaction products.

9. A process for the production of mono-glycerides of fatty acids as claimed in claim 1, wherein the monoglyceride is separated from the reaction products by neutralising the catalyst with citric acid, distilling off the tertiary butyl alcohol, adding water during the latter part of the distillation, and allowing the products to separate into two layers, and separating the mono-glyceride layer from the aqueous glycerine solution.

10. A process for the production of monoglycerides of fatty acids as claimed in claim 5, wherein the monoglyceride is separated from the reaction products by neutralising the catalyst with citric acid, distilling off the tertiary butyl alcohol, adding water during the latter part of the distillation, and allowing the products to separate into two layers, and separating the monoglyceride layer from the aqueous glycerine solution.

11. A process for the production of monoglycerides of fatty acids as claimed in claim 7, wherein the monoglyceride is separated from the reaction products by neutralising the catalyst with citric acid, distilling off the tertiary butyl alcohol, adding water during the latter part of the distillation, and allowing the products to separate into two layers, and separating the monoglyceride layer from the aqueous glycerine solution.

12. A process for the production of monoglycerides of fatty acids as claimed in claim 1, wherein the monoglyceride is separated from the reaction products without neutralising the catalyst by allowing the monoglyceride to crystallise out, separating the crystals, and utilising the mother liquor for the production of further monoglyceride.

13. A process for the production of monoglycerides of fatty acids as claimed in claim 5, wherein the monoglyceride is separated from the reaction products without neutralising the catalyst by allowing the monoglyceride to crystallise out, separating the crystals, and utilising the mother liquor for the production of further monoglyceride.

14. A process for the production of monoglycerides of fatty acids as claimed in claim 7, wherein the monoglyceride is separated from the reaction products without neutralising the catalyst by allowing the monoglyceride to crystallise out, separating the crystals, and utilising the mother liquor for the production of further monoglyceride.

References Cited in the file of this patent
UNITED STATES PATENTS
2,553,288    Young et al. _____ May 15, 1951